United States Patent
Mowbray et al.

(10) Patent No.: US 7,891,263 B2
(45) Date of Patent: Feb. 22, 2011

(54) DUAL SPEED TRANSMISSION

(75) Inventors: Graham Mowbray, New South Wales (AU); Richard Terrence Tamba, New South Wales (AU); Stephen Tapper, New South Wales (AU); Paul Donnelly, New South Wales (AU)

(73) Assignee: NT Consulting International Pty Limited, Castle Hill (AU)

( * ) Notice: Subject to any disclaimer, the term of this patent is extended or adjusted under 35 U.S.C. 154(b) by 545 days.

(21) Appl. No.: 10/565,474

(22) PCT Filed: Jul. 20, 2004

(86) PCT No.: PCT/AU2004/000973

§ 371 (c)(1),
(2), (4) Date: Aug. 22, 2006

(87) PCT Pub. No.: WO2005/007503

PCT Pub. Date: Jan. 27, 2005

(65) Prior Publication Data

US 2007/0180941 A1    Aug. 9, 2007

Related U.S. Application Data

(60) Provisional application No. 60/506,947, filed on Sep. 28, 2003.

(30) Foreign Application Priority Data

Jul. 21, 2003  (AU) .............................. 2003903771
Mar. 5, 2004  (AU) .............................. 2004901167

(51) Int. Cl.
*F16H 3/38* (2006.01)
*F16H 3/08* (2006.01)
*B63H 20/14* (2006.01)

(52) U.S. Cl. .............................. 74/340; 74/330; 440/75
(58) Field of Classification Search ................. 74/329, 74/330, 333, 340, 355, 665 R, 416, 417; 440/75
See application file for complete search history.

(56) References Cited

U.S. PATENT DOCUMENTS 1,701,403 A * 2/1929 Coykendall .................. 74/361

(Continued)

FOREIGN PATENT DOCUMENTS

AU           661697         1/1994

(Continued)

*Primary Examiner*—Roger Pang
(74) *Attorney, Agent, or Firm*—Blakely, Sokoloff, Taylor & Zafman (57) ABSTRACT

A two speed transmission system mounted for driving a marine craft comprising: an input shaft coupled in direct connection with a driveshaft of an engine of the marine craft; an output shaft coaxial with the input shaft coupled in direct connection with a driveline of the marine craft; a first gear train for transmitting drive at a fixed first gear ratio; a second gear train for transmitting drive at a fixed second gear ratio; a first friction clutch operable to engage/disengage the first gear train; and a second friction clutch operable to engage/disengage the second gear train, wherein in shifting between the first gear ratio and the second gear ratio one of the friction clutches is disengaged using controlled slippage while the other friction clutch is engaged using controlled slippage.

11 Claims, 11 Drawing Sheets

U.S. PATENT DOCUMENTS

| | | |
|---|---|---|
| 1,795,135 A | 3/1931 | Molly |
| 4,323,354 A | 4/1982 | Blanchard |
| 4,331,432 A | 5/1982 | Blanchard |
| 4,400,163 A | 8/1983 | Blanchard |
| 4,747,795 A | 5/1988 | Kawamura et al. |
| 5,085,302 A | 2/1992 | Kriesels |
| 5,181,431 A * | 1/1993 | Zaiser et al. .................. 74/333 |
| 5,494,466 A * | 2/1996 | Vernea ........................ 440/75 |
| 6,209,406 B1 * | 4/2001 | Sperber et al. ................ 74/330 |
| 6,755,089 B2 * | 6/2004 | Hirt ............................ 74/329 |
| 6,826,974 B2 * | 12/2004 | Kobayashi ................... 74/339 |
| 2002/0129671 A1 * | 9/2002 | Yamasaki et al. ............. 74/325 |

FOREIGN PATENT DOCUMENTS

| | | |
|---|---|---|
| EP | 0688 974 A1 | 12/1995 |
| GB | 596307 | 1/1948 |
| GB | 1241744 | 8/1971 |
| GB | 2 205 366 A | 12/1988 |
| GB | 2 367 598 A | 4/2002 |
| JP | 2002/048199 | 2/2002 |

* cited by examiner

DUAL SPEED TRANSMISSION

CROSS-REFERENCE TO RELATED APPLICATIONS

This invention claims priority from Australian provisional application No. 2003903771 and also from United States provisional application No. 60/506,947 filed Sep. 28, 2003. The entire contents of both documents are incorporated by reference. Reference is also made to a related provisional application filed by the same applicant/assignee Australian provisional application number 2004901167 the entire contents of which are also incorporated by reference.

FIELD OF THE INVENTION

The present invention relates to a transmission. In particular, the invention relates to a two speed dual clutch automated manual transmission which is particularly suited for use in marine applications but may also be used in other applications, particularly where a compact transmission is desirable.

BACKGROUND OF THE INVENTION

In most existing marine drives in watercraft, a marine engine is coupled to a propeller via a gear box which provides a single gear ratio. The speed of the watercraft is controlled by controlling the engine speed via a throttle. Generally speaking, watercraft are geared so that they run most efficiently at their intended cruising speed. A large yacht may be designed to cruise at 35 to 40 knots and is thus geared to be most efficient and controllable at or around that speed. However a problem with this arrangement is that such craft are very difficult to operate at the low speeds that may be required for example, when docking the craft. It is very difficult to dock a boat safely if, for example, the lowest speed that the boat will satisfactorily travel at, is around 10 knots. It is also, in some cases, desirable to have a low gear ratio for applications where increased torque is required, with a higher gear ratio for high speed operation.

Although a number of multi-speed drive transmissions have been proposed for watercraft, they suffer from a number of problems. For example, U.S. Pat. No. 6,350,165 discloses a watercraft which incorporates a two forward speed plus one reverse speed transmission. The transmission is based on a planetary gear apparatus and is consequently relatively high cost. The transmission has a further problem in that because of the way the gearing is arranged, it is not possible to vary the gear ratios easily, since all the gear wheels must be changed. It is thus harder to package and adapt planetary gearing systems to suit different applications, engine sizes and the like.

A further problematic area with watercraft, concerns "torque interrupt". Torque interrupt occurs when a transmission system is temporarily disengaged when the gear ratio of the transmission system is changed. One common example of torque interrupt occurs when a driver changes gear in a motor vehicle. Whilst it is acceptable to have torque interrupt in a motor car, since the momentum of the vehicle will keep the vehicle moving during the period when the transmission is temporarily disengaged, in a watercraft, torque interrupt is a more serious problem because the drag on a watercraft's hull is much greater than the frictional drag on a motor vehicle and the watercraft is appreciably slowed during any period when the transmission is disengaged.

A further problem which occurs with watercraft, is "clunking" which occurs as a watercraft is put into forward or reverse gear. Whilst it is not a serious problem from an operational point of view, clearly a person spending a large sum of money to buy a watercraft, particularly at the more expensive end of the market, might expect to get a transmission system which does not "clunk" when the craft is put into gear.

Examples of the present invention seek to address or alleviate one or more of the problems of the prior art.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In accordance with one aspect of the present invention, there is provided a two speed transmission system for a marine craft comprising:
 an input shaft;
 an output shaft coaxial with the input shaft;
 a first gear train for transmitting drive from the input shaft to the output shaft at a first gear ratio;
 a second gear train for transmitting drive from the input shaft to the output shaft at a second gear ratio;
 a first friction clutch operable to engage/disengage the first gear train; and
 a second friction clutch operable to engage/disengage the second gear train;
 wherein the input shaft is isolated from driving interconnection with the output shaft by disengagement of both clutches; and
 wherein in shifting between the first gear ratio and the second gear ratio one of the friction clutches is disengaged using controlled slippage while the other friction clutch is engaged using controlled slippage.

In accordance with another aspect of the present invention, there is provided a two speed transmission system including:
 an input shaft;
 an output shaft coaxial with the input shaft;
 a lay shaft arranged parallel to the input and output shafts;
 a first gear train for connecting the input shaft to the lay shaft for driving the same via the input shaft;
 a second gear train connecting the lay shaft to the output shaft;
 a first clutch means for connecting the input shaft to the output shaft via the lay shaft giving a first gear ratio other than 1:1; and
 a second clutch means for connecting the input shaft to the output shaft at a second gear ratio;
 wherein the input shaft is isolated from driving interconnection with the output shaft by disengaging both the first and second clutch means; and
 wherein in shifting between the first gear ratio and the second gear ratio one of the clutch means is disengaged using controlled slippage while the other clutch means is engaged using controlled slippage.

A compact two speed transmission system for a marine craft comprises:
 an input shaft;
 an output shaft,
 a first gear train for connecting the input shaft to the output shaft for driving the same in a first gear;
 a second gear train connecting the input shaft to the output shaft for driving the output shaft in a second gear; and a clutch means for connecting the input shaft to the output shaft at a gear ratio other than one to one.

The output shaft and input shaft may be parallel and linked by gear trains for first and second gears.

Alternatively, the output shaft and input shaft may be co-axial and linked via a lay shaft extending parallel to the input and output shafts.

Preferably the gear trains are selected to provide a higher gearing i.e. faster spinning of the lay shaft when the second clutch is engaged although an opposite arrangement would be possible.

In a preferred example a one way clutch means is incorporated in the first gear train so that when second gear is engaged first gear over-runs.

The clutch means may be a friction clutch

A further friction clutch means connecting first gear to the output shaft may be provided.

The friction clutch or clutches may be located on the output shaft either between the first and second gears or with the first and second gears located between the clutches and the output end of the output shaft.

A control system may be provided for controlling the first and second clutches. Amongst other inputs, the control system may receive inputs from various sensors including clutch pressure sensors, sensors measuring the speed of the input shaft and output shafts respectively and sensors providing information relating to the position of gears in the gear trains.

One or more control valves and electro-hydraulic solenoids may be used to provide controlled clutch slip for docking and other functions where very low speeds of the order of a few knots may be desired.

The control system may also be used to control the solenoid to allow slipping of the clutch when initiating movement of the watercraft to avoid the problem of "clunking" as the boat is put into, or taken out of, gear.

A two speed transmission system includes a first clutch means for connecting an input shaft to a co-axial output shaft;

a lay shaft typically parallel to the input and output shafts;

a first gear train for connecting the input shaft to the lay shaft for driving the same via the input shaft;

a second gear train connecting the lay shaft to the output shaft;

wherein the first clutch means connects the input shaft to the output shaft; and a second clutch means connects the input shaft to the output shaft via the lay shaft giving a gear ratio other than one to one.

Preferably, the gear trains are selected to provide a higher gearing ie faster spinning of the lay shaft when the second clutch is engaged although an opposite arrangement would be possible.

Using the present invention the problem of torque interrupt may be overcome by operating the transmission so that the first clutch is disengaged simultaneously with the engagement of the second clutch and vice versa.

A control system may be provided for controlling the first and second clutches. Amongst other inputs, the control system may receive inputs from various sensors including clutch pressure sensors, sensors measuring the speed of the input shaft and output shafts respectively and sensors providing information relating to the position of gears in the gear trains.

One or more control valves and electro-hydraulic solenoids may be used to provide controlled clutch slip for docking and other functions where very low speeds of the order of a few knots may be desired.

The control system may also be used to control the solenoid to allow slipping of the clutch when initiating movement of the watercraft to avoid the problem of "clunking" as the boat is put into, or taken out of, gear.

Transmissions embodying the various aspects of the present invention may be used in a watercraft particularly, but not exclusively in a stern drive unit.

BRIEF DESCRIPTION OF THE DRAWINGS

The invention is described, by way of non-limiting example only, with reference to the accompanying drawings in which.

DETAILED DESCRIPTION

Figure 1:
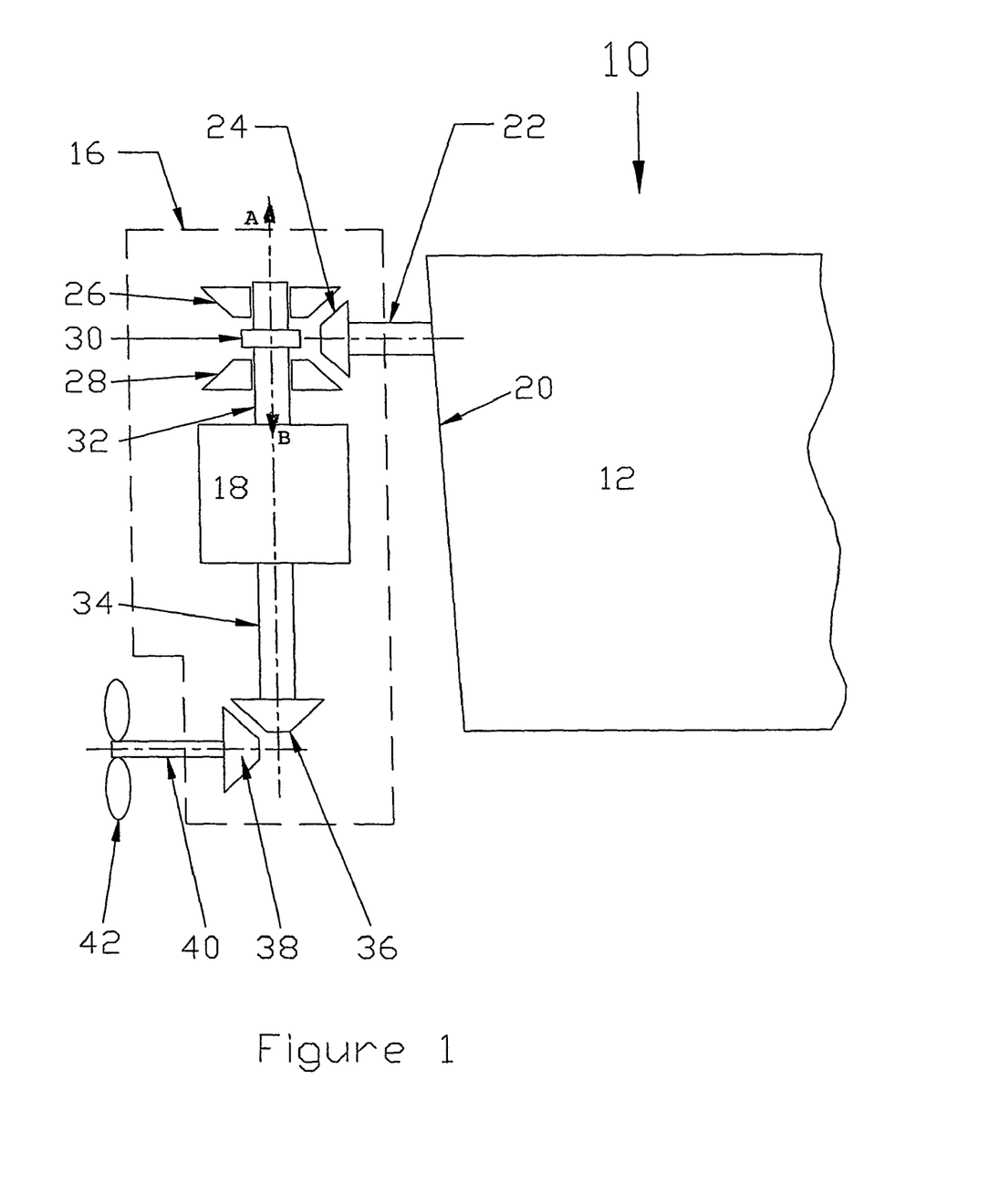
FIG. 1 is a schematic diagram of the stern of a watercraft having a stern drive transmission of the type that is commonly referred to as a bravo type in the art.

Referring to the drawings, FIG. 1 shows the stern of a watercraft 10 having a hull 12. A stern drive unit 16 incorporating a dual clutch automated manual transmission 18 is located behind the transom 20 of the watercraft, an engine (not shown) is located inside the hull and an output shaft 22 from the engine projects generally horizontally from the stern of the watercraft provides power to the stern drive unit 16. This type of marine propulsion system is also commonly referred to as an "inboard/outboard drive".

The output shaft 22 of the watercraft 10 spins about a generally horizontal axis. A bevel gear 24 is fixed to the distal end of the output shaft 22. The bevel gear 24 defined at the end of the output shaft 22 meshes with forward and reverse bevel gears 26, 28 respectively and a dog clutch 30 (or similar device such as a cone clutch, friction clutch, or the like) moves in the direction of arrow "A" to connect a vertical output shaft 32 with the forward bevel gear 26, or in the direction "B" to connect the vertical output shaft 32 with the reverse bevel gear 28. A lower part 34 of the vertical output shaft is operatively connected to a further pair of meshing bevel gears 36, 38 which convert the vertical axis movement of the lower part 34 of the output shaft 32 to rotation of a generally horizontal shaft 40 driving a propeller or propellers 42. The above arrangement is typical of existing marine stern drive systems and is commonly known by some companies as a "Bravo" type drive. The present invention is concerned with a transmission system and control means which not only provide two speed drive for the watercraft but also provide a number of other advantages over existing marine transmission systems.

Figure 2:
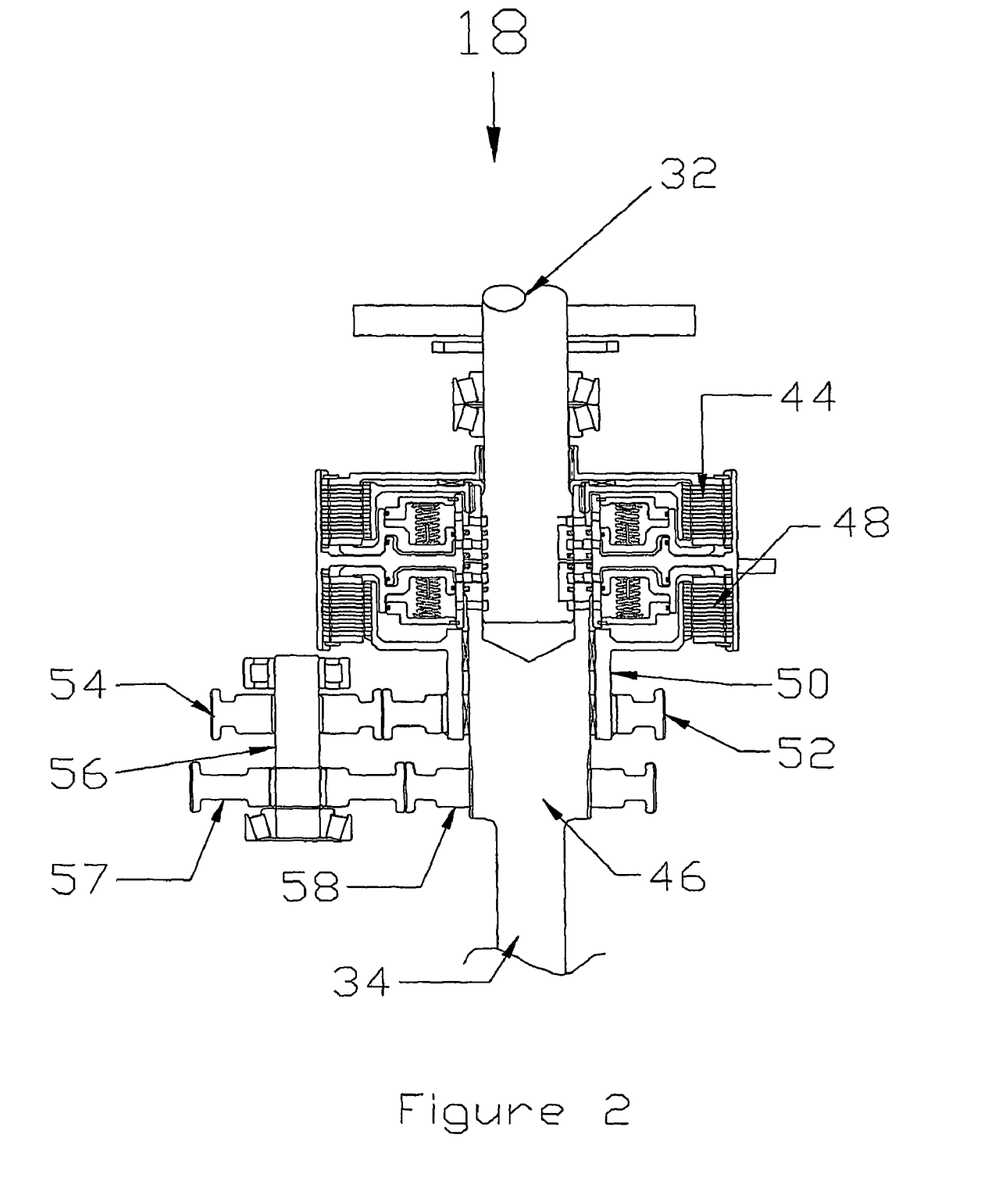
FIG. 2 is a schematic diagram of a first stern drive transmission for the watercraft of FIG. 1.

FIG. 2, shows a first transmission 18 in more detail. Instead of being directly coupled to the lower bevel gear 36 as in most existing stern drives, the vertical output shaft 32 (which is the input shaft for the transmission 18) is connected via a first friction clutch 44 to a co-axial lower output shaft 46. When the first clutch 44 is engaged the lower output shaft 46 spins at the same rate as the vertical output shaft 32. A second friction clutch 48 is also provided. When the second friction clutch 48 is engaged, a lay shaft 56 is driven via components 52, 54 which in turn drives the lower output shaft 46 via gears 57 and 58. In the described example, the gearing has been selected to provide a higher gearing i.e. faster spinning of the lower shaft 46 when the second clutch is engaged, however this is not necessarily the case in all examples and the gears may be used as overdrive or underdrive. Forward and reverse is still selected by the bevel gearing and dog clutch 30 (or similar device) at the head of the output shaft 32, so the system can provide two speeds in both forward and reverse directions.

Figure 3:
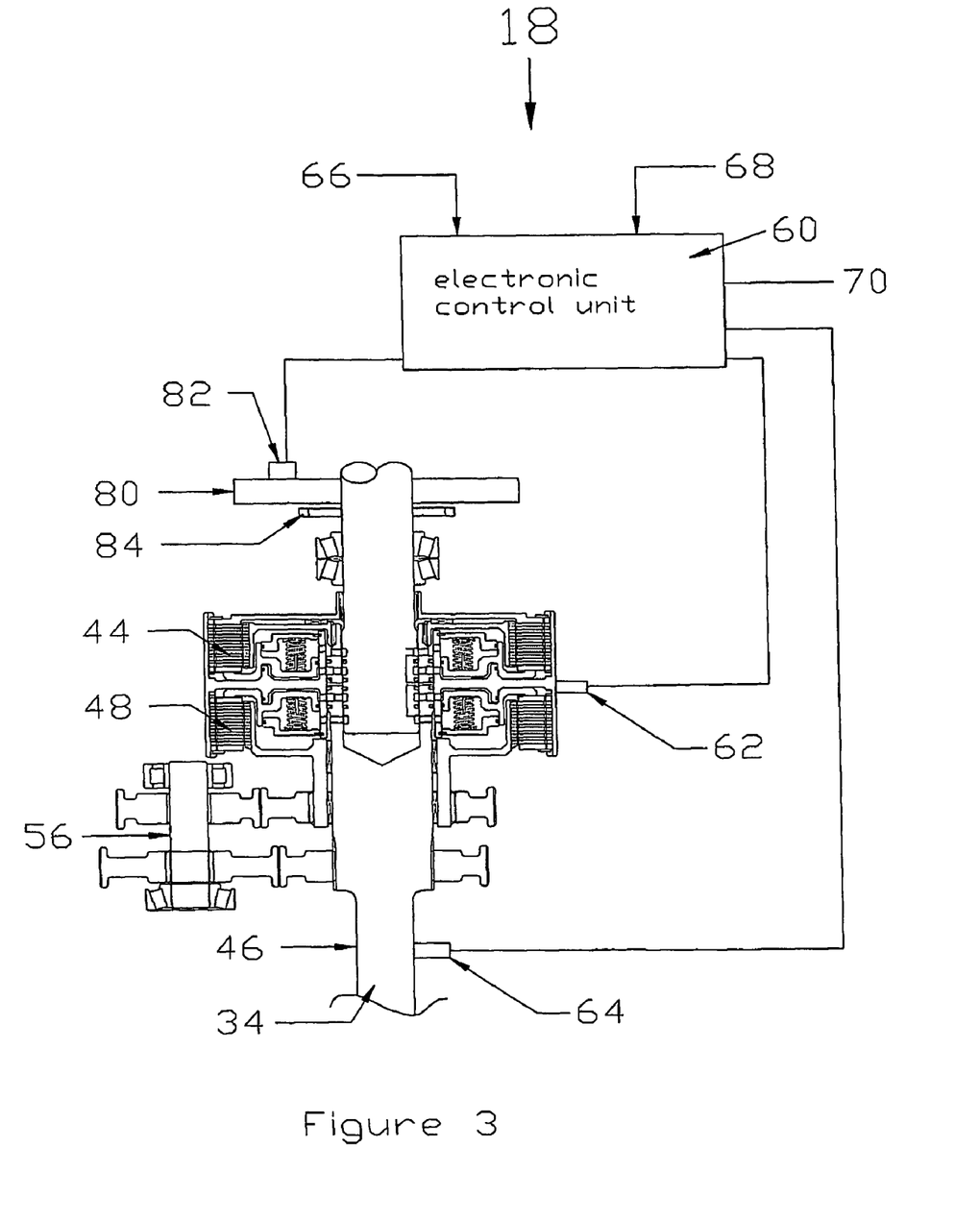
FIG. 3 repeats the diagram of FIG. 2 with a control system superposed on the diagram.

A control system illustrated in FIG. 3 is provided for controlling the dual clutches 44, 48. The control system includes an electronic control unit (ECU) 60 linked to various sensors including sensors providing information to the ECU regarding the position/pressure of the clutches. The system also includes sensors 62 and 64 measuring the speed of the input shaft 32 of the transmission 18 and the output shaft 34 of the transmission 18, respectively, and sensors 66 providing information about the position of the gears, sensors 68 providing information about to the engine's throttle position, and sensors 70 providing information concerning to the temperature of the systems hydraulic fluid. Alternatively, some of this information can be collected off the common vessel/engine BUS or CAN.

The control system controls the output speed through control of piston pressure via an electrical signal sent to the electro hydraulic solenoid 82. The system may receive electronic requests for the various modes that the system operates such as docking, trolling, hi-launch energy, from any suitable input means such as buttons, levers, radio controls or the like.

FIG. 3 also shows a valve body 80 containing a control valve and an electro-hydraulic solenoid 82 (more than one may be used) to activate controlled clutch slip as described in more detail below. The pressure of the solenoid 82 can also be fed to the ECU. FIG. 3 also illustrates a hydraulic pump 84 used for maintaining hydraulic pressure in the system's hydraulic controls.

The control system is arranged to allow slipping of the clutch to avoid the problem of "clunking" as the boat is put into, or taken out of, gear. The dog clutch 30 (or similar device) will engage shaft 22 with either the forward or reverse bevel gear 26, 28, with the output shaft 34 disengaged. The control system is arranged to gradually apply the clutch using an electro-hydraulic solenoid to smoothly transfer power from the input shaft 32 to the output shaft 34.

The system of clutch slipping may also be used for docking functions where very low speeds of the order of a few knots may be desired and wherein clutch slip may be used to dissipate excess rotational speed of the output shaft 34 to allow slower movement of the boat whilst maintaining engine speed. In addition, the control of slip speed allows the clutch to slip at any speed or torque which achieves high energy launches and also protects the driveline of a marine craft when the craft's propeller contacts obstacles such as the sea bed, branches, rocks, or the like.

The problem of torque interrupt is overcome by operating the transmission so that the first clutch is disengaged simultaneously using controlled slippage with the engagement of the second clutch using controlled slippage and vice versa, when the boat is moving.

Figure 4:
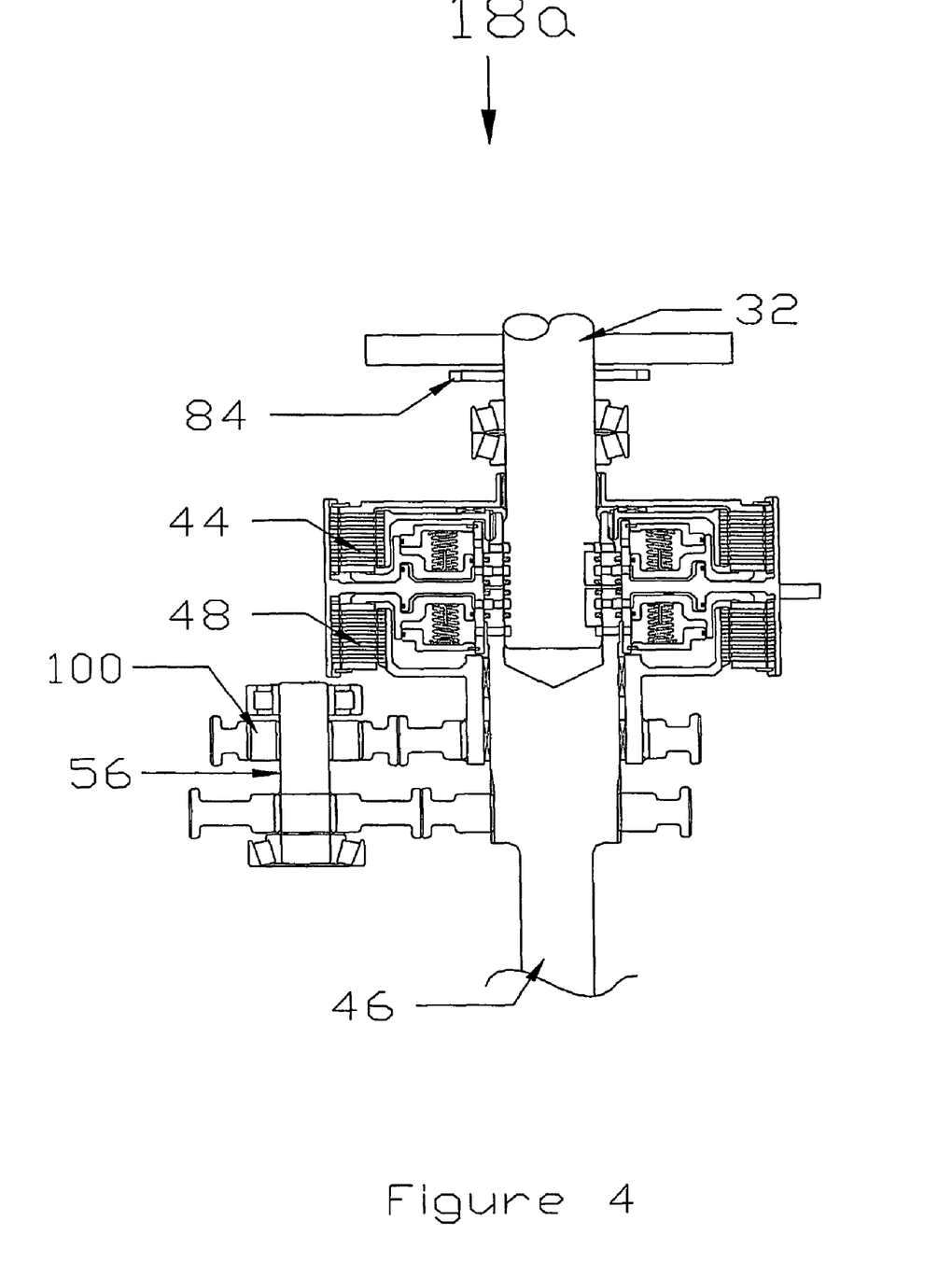
FIG. 4 is a schematic diagram of a second stern drive transmission.
Figure 5:
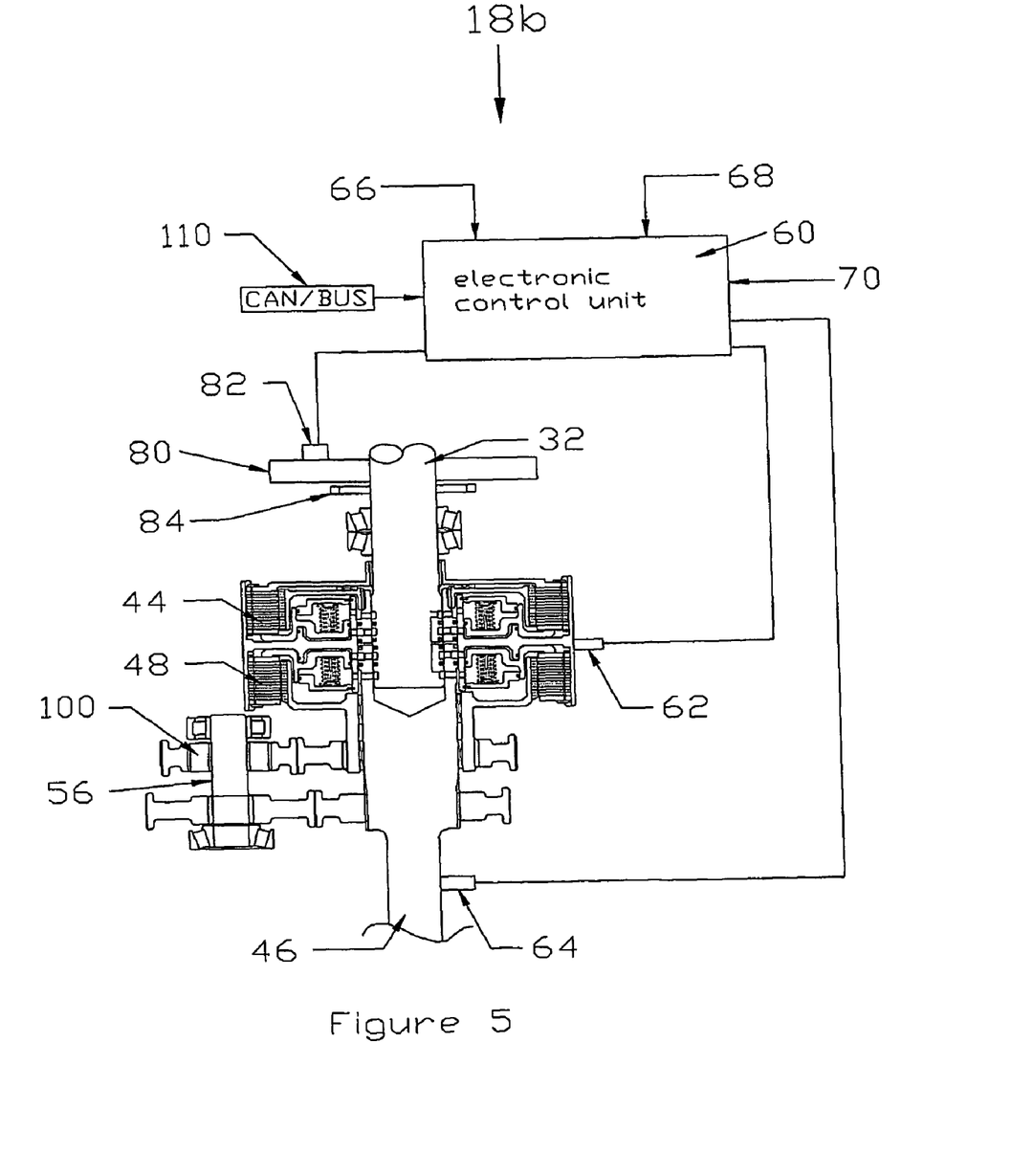
FIG. 5 repeats the diagram of FIG. 4 with a control system superposed on the diagram.

FIGS. 4 and 5 illustrate a variant 18a of the transmission of FIGS. 2 and 3. Components which are common to both examples have the same reference numerals. In the transmission 18a a one way clutch 100 is provided between the lay shaft 56 and the input shaft 32. This gives the advantage of a smooth gearshift without having to time a clutch swap since the one way clutch 100 will either grab or let go depending on which gear is selected. The disadvantage of this is that reverse gear may be operated in the lower gear only. In this example the control system is connected to the common vessel/engine BUS or CAN 110

Figure 6:
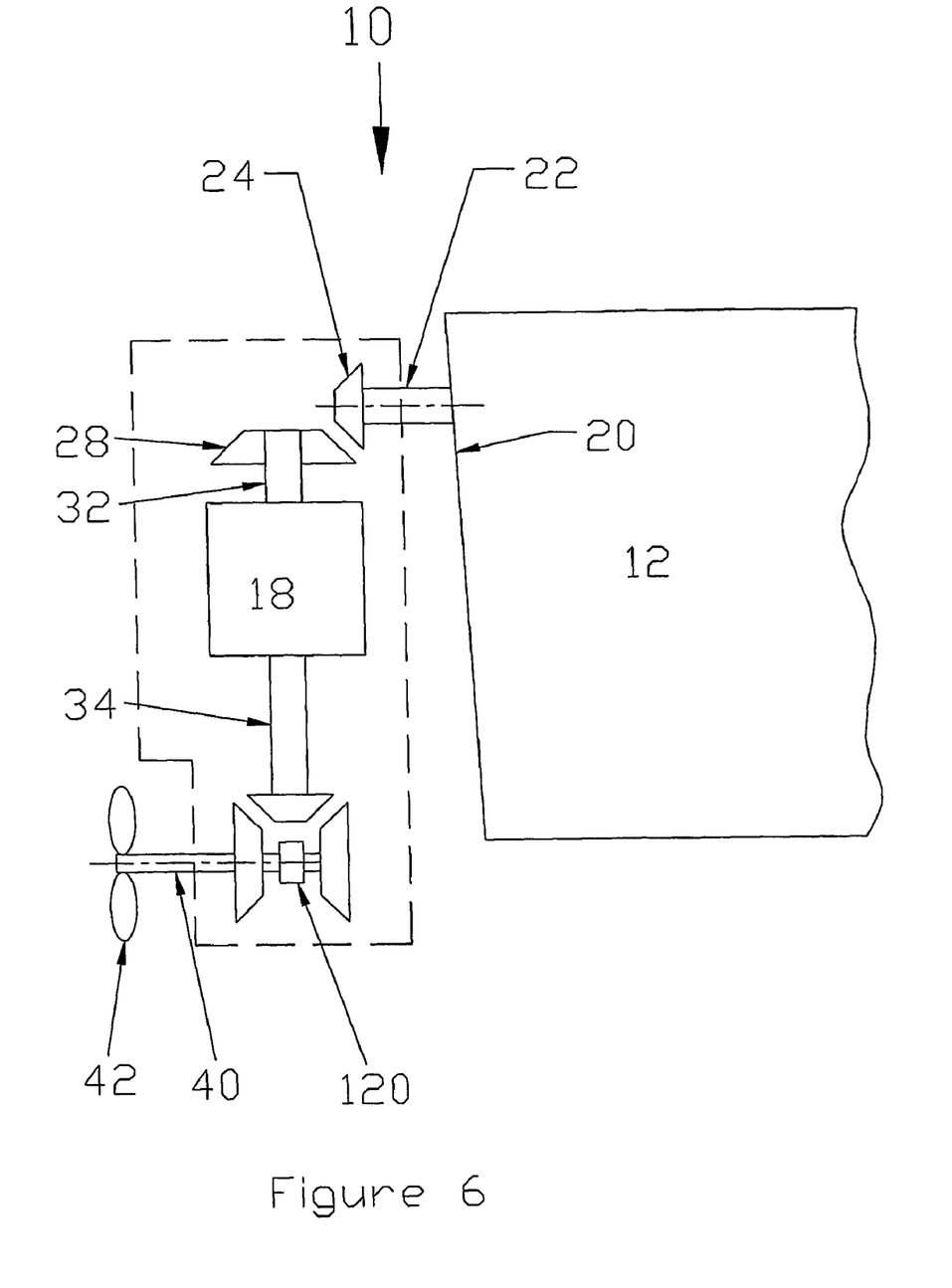
FIG. 6 is a schematic diagram of the stern of a watercraft having a stern drive transmission of the type that is commonly referred to as an alpha type in the art.

FIG. 6 illustrates the system in use with an "alpha" type drive instead of the bravo "type" drive shown in FIG. 1. In this case the output shaft 22 is directly connected to shaft 32 via bevel gears 24 and 28, and forward and reverse are provided at the lower end of the drive adjacent the propeller 42 selected via a dog clutch 120 or similar means.

Although the system described above incorporates two wet clutches, it would be appreciated that dry clutches could also be substituted for the wet clutches.

Figure 7:
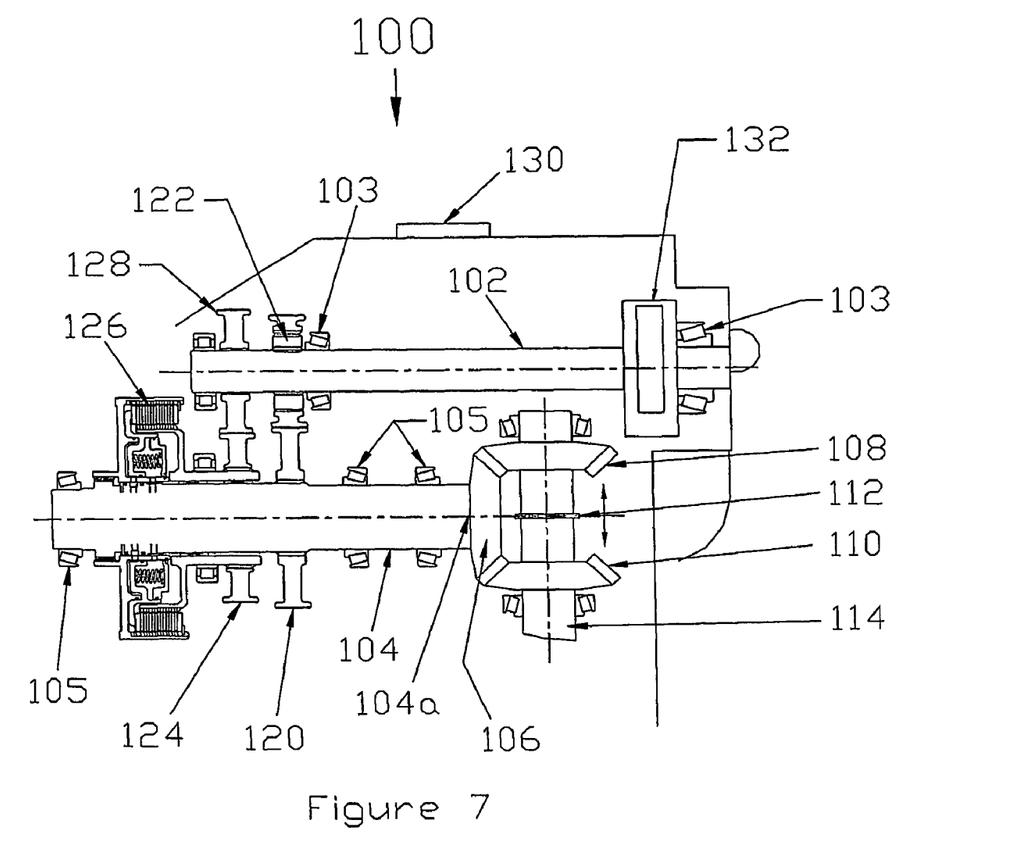
FIG. 7 is a schematic diagram of a two-speed transmission having a single friction clutch in which the output gears are located close to the output of the transmission.

FIG. 7 shows a further marine transmission, in this case, a single friction clutch automated manual transmission 101. As in the case in the previously described transmission, this transmission is also shown as part of an inboard/outboard marine drive.

The output shaft of the watercraft, not shown, spins about a generally horizontal axis and is coaxial with and drives the input shaft 102 of the transmission which is mounted on bearings 103. The output shaft 104 of the marine transmission, is supported on bearings 105 parallel to and spaced from the input shaft 102.

A bevel gear 106 defined at the output end 104a of the output shaft 104 meshes with forward and reverse bevel gears 108, 110, respectively and a dog clutch 112 (or similar device) moves in a vertical direction to connect a vertical output shaft 114 with either the reverse bevel gear 110 or the forward bevel gear 108, or vice versa depending on whether a right hand or left hand propeller is fitted.

The selection of forward or reverse motion for the marine craft direction of the propeller is carried out by the dog clutch 112 after the output of the marine transmission and therefore the input and output shafts of the marine transmission, always rotate in the same sense, and the transmission 101 is not required to cope with rotation of the input or output shafts in more than one direction.

As is standard in the art, a lower part of the vertical output shaft 114, not shown, is operatively connected to a further pair of meshing bevel gears, which convert the vertical axis movement of the vertical output shaft 114 to a generally horizontal axis movement of a horizontal shaft driving a propeller.

A gear wheel 120, for first gear is mounted on the output shaft 104 and this in turn, meshes with gear wheel 122 incorporating a one-way clutch mounted on the input shaft 102. A gear wheel 124 for second gear and an associated clutch 126, is mounted on the output shaft 104 adjacent the first gear and on the opposite side of first gear 120 to the output end 104a of the output shaft. The second gear 124 meshes with a gear wheel 128 mounted on the input shaft 102 adjacent the gear wheel 122 incorporating the one-way clutch.

When the clutch 126 is not engaged, which is the default condition so that the marine craft is able to travel in first gear in the event of failure of the clutch 126, the input shaft 102 drives the output shaft via first gear 120 which is used for docking and low speed maneuvering. The gears rotate and slip occurs across the first clutch pack. The main part of the clutch 126 rotates with the output shaft.

When the clutch 126 is engaged, second gear is engaged, and the clutch 126 and second gear 124 turn with the output shaft 104. First gear 120 is forced to rotate at the same angular speed as second gear 124 and the one-way clutch 122 over runs.

In contrast with existing marine transmissions it will be appreciated that it is a relatively simple matter to change gear ratios by simply replacing two gear wheels, or four gear wheels if both first and second ratios are to be changed (although second is normally 1:1).

A further advantage is that the drive uses only one friction clutch to provide the two different gears and can therefore be more compact.

The transmission incorporates a control system including an electronic control 130, hydraulic pump 132 and sensors of the same type that are described in relation to the previously described examples.

Figure 8:
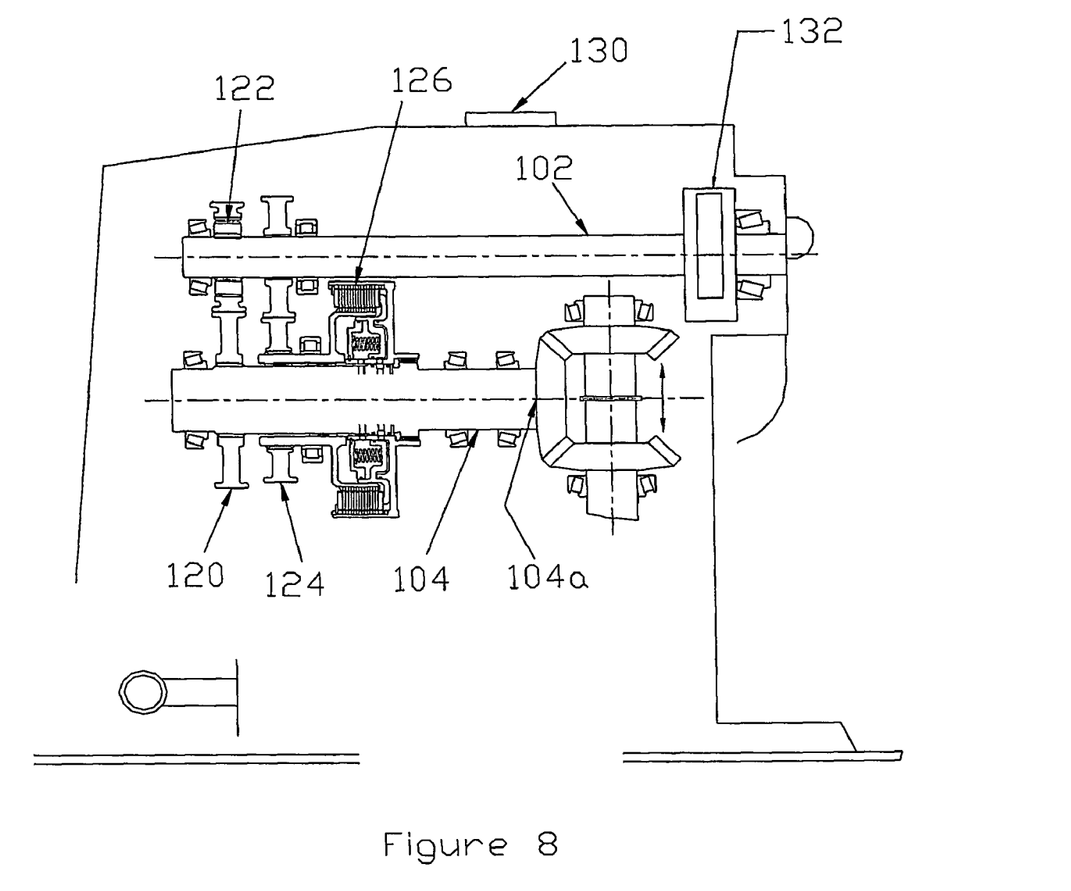
FIG. 8 shows a two-speed transmission with a single friction clutch in which the clutch is located close to the output.

FIG. 8 shows a similar arrangement to that which is shown in FIG. 7 except that in this arrangement the relative positions of the first 120 and second 124 gear wheels are reversed on the input 102 and output 104 shafts and the clutch 126 is located adjacent the output end of the output shaft 104. This arrangement has the advantage that it makes the overall transmission shorter at the top, and helps to ensure that the transmission can clear the swim platform, as is discussed in more detail below with reference to FIG. 11. In FIG. 8, and in the subsequently described transmission systems, components which are common to the transmission system of FIG. 7 carry the same reference numerals.

Figure 9:
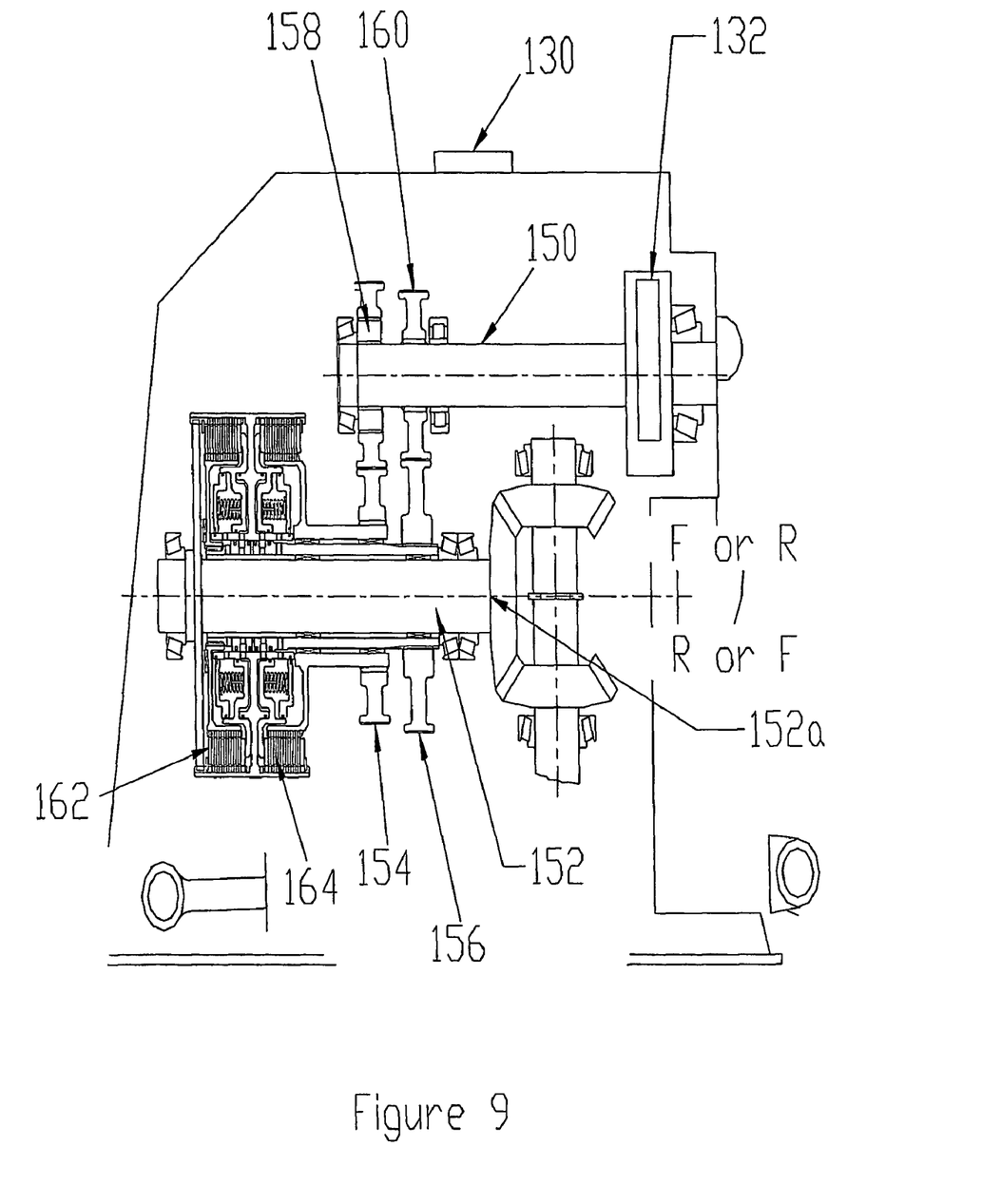
FIG. 9 shows a two-speed transmission with dual clutches with the output gears located at the output end of the shaft.
Figure 10:
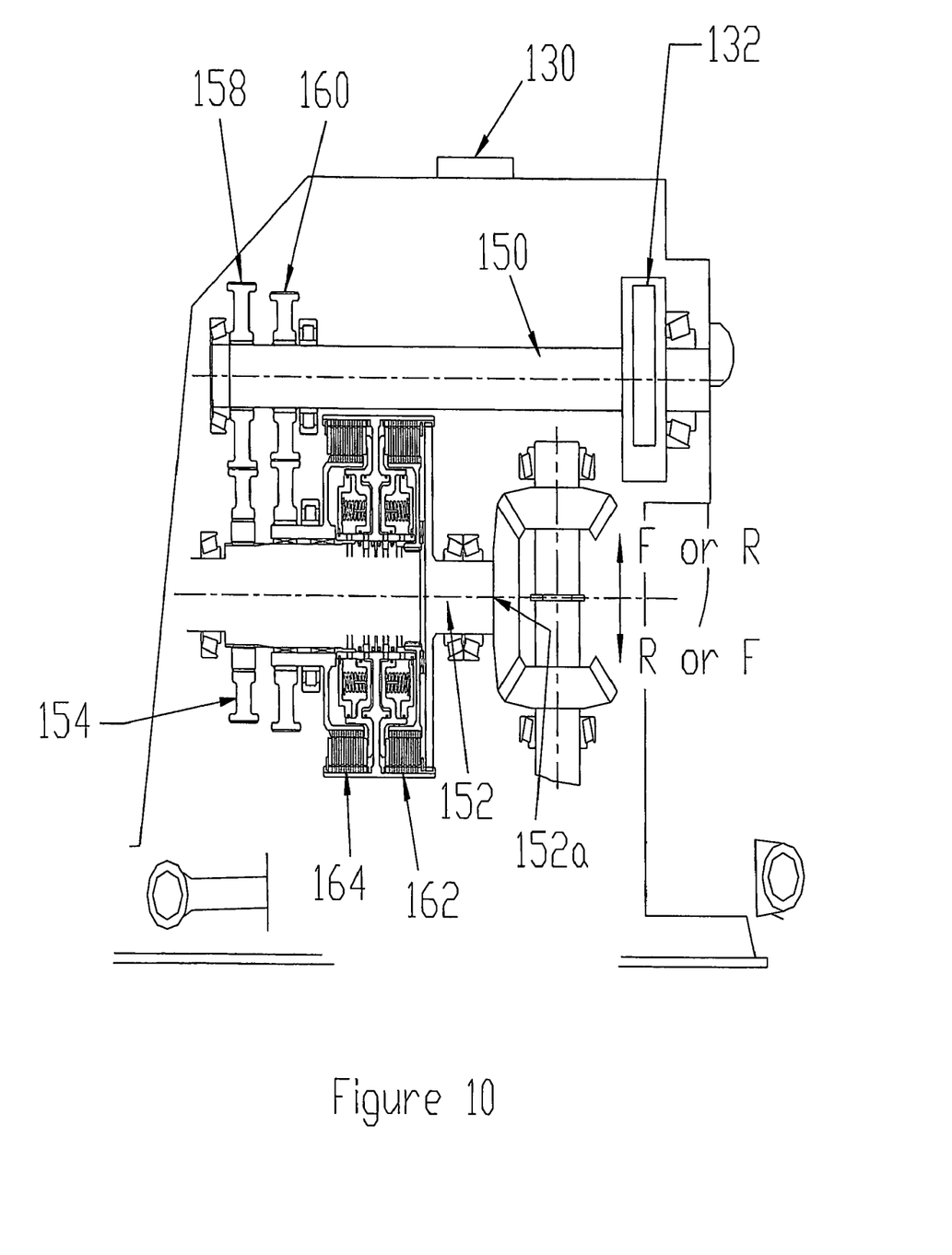
FIG. 10 shows a two-speed transmission having two clutches on which the clutches are located near the output end of the transmission.

FIGS. 9 and 10 illustrate two-speed marine transmissions incorporating two friction clutches. As shown in FIG. 9, the input shaft 150 again extends parallel to and is spaced apart from the output shaft 152, and the output end 152a of the output shaft is again connected to a bevel gear and dog clutch arrangement for driving a boat's propeller via a vertical shaft, in a similar arrangement to what is described for the transmissions of FIGS. 7 and 8.

The input shaft 150 is connected to the output shaft 152 via first gear 154 and second gear 156. First gear 154 meshes with gear wheel 158 which includes a one-way clutch. Second gear 156 meshes with gear wheel 160. Friction clutches 162 and 164 are provided for engaging second and first gears respectively.

When second gear is engaged using clutch 162, the one-way clutch over runs and gear wheel 158 simply spins with respect to the input shaft 150. In second gear, the first gear 154 and the outside of the clutch 164 associated with the first gear, rotate slower than the output shaft 152.

This arrangement provides a number of advantages over existing marine drives including such as are described above in connection with the examples shown in FIGS. 1 to 6 by using electro-pneumatic or electro-hydraulic solenoids to control the friction clutch. The arrangement is not counter rotational sensitive since the forward and reverse choice is made after the end of the output shaft 152a.

Figure 11:
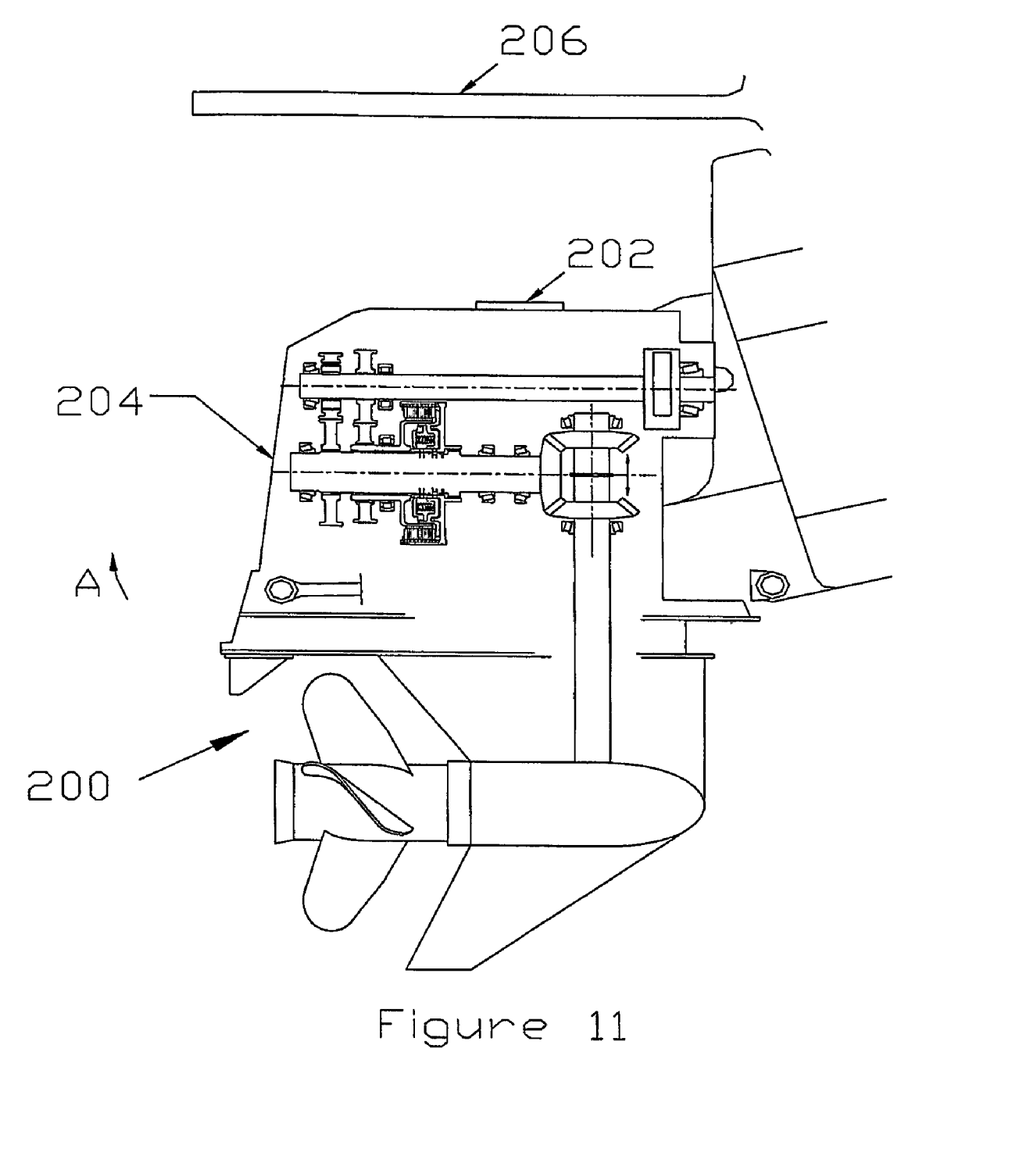
FIG. 11 illustrates the position of the transmission relative to a swim platform on a marine craft.

An alternative arrangement is shown in FIG. 10. In this version, the two clutch packs 162, 164 are located on the opposite side of the gears, in between the gears and the output of the output shaft 152. Compared to the arrangement of FIG. 10, FIG. 9 is shorter at the top. This arrangement makes the overall transmission shorter at the top. When the stern drive is not in use, it is raised out of the water, but there is a swim platform that the drive must clear. This design being shorter at the top axis allows more room for clearing the swim platform. Turning to FIG. 11, the transmission and propeller assembly 200 may be lifted out of the water by rotating the assembly in a clockwise direction, indicated by arrow A. The top of the assembly 202 moves towards the rear of the boat and the rear 204 moves towards the swim platform 206. The shorter the transmission is, the less likely it is to interfere with the swim platform.

Also, in FIG. 10, the one way clutch is provided on the first gear 154 on the output shaft 152 rather than the meshing gear wheel 158 on the input shaft. With this arrangement, the output shaft 152 will rotate faster in second and then over run the one way clutch at the differential speed of the first gear ratio.

Further, although the system is described as being incorporated in the stern drive unit of an inboard/outboard marine propulsion system, it will be appreciated that the system could also be incorporated in outboard systems where the engine and transmission systems are all located behind the transom due to its compact size and light weight. It could also be used in variations of shaft drive v-drive, jet drive and surface drive marine propulsion systems between the engine and the propeller.

The transmission may also be used in non-marine applications where size, cost and weight are an issue such as in fork-lift or industrial transmissions.

It will be appreciated by persons skilled in the art that numerous variations and/or modifications may be made to the invention as shown in the specific embodiments without departing from the spirit or scope of the invention as broadly described. The present examples are, therefore, to be considered in all respects as illustrative and not restrictive.

The claims defining the invention are as follows:

1. A two speed transmission system mounted for driving a marine craft:
    an input shaft coupled in direct connection with a driveshaft of an engine of the marine craft;
    an output shaft coaxial with the input shaft coupled in direct connection with a driveline of the marine craft;
    a first gear train for transmitting drive from the input shaft to the output shaft at a low speed fixed first gear ratio;
    a second gear train for transmitting drive from the input shaft to the output shaft at a cruising speed fixed second gear ratio;
    a first friction clutch operable to engage/disengage the first gear train, whereby the first friction clutch is engaged to drive the marine craft in the low speed first gear ratio; and
    a second friction clutch operable to engage/disengage the second gear train, whereby the second friction clutch is engaged to drive the marine craft in the second gear ratio;
    wherein the input shaft is isolated from driving interconnection with the output shaft by disengagement of both clutches;
    wherein in shifting between the first gear ratio and the second gear ratio one of the friction clutches is disengaged using controlled slippage while the other friction clutch is engaged using controlled slippage; and
    wherein the second friction clutch is operable to engage the output shaft in direct 1:1 drive with the input shaft, and the first friction clutch is operable to connect the input shaft to the output shaft via a lay shaft such that the first gear ratio other than 1:1.

2. A two speed transmission system as claimed in claim 1, wherein the first gear train includes the lay shaft which is in driven engagement with the input shaft when the first friction clutch is engaged for operation at the first gear ratio, and wherein the lay shaft is isolated from direct driven engagement with the input shaft by disengagement of the first friction clutch.

3. A two speed transmission system as claimed in claim 2 wherein the output shaft and input shaft are linked via the lay shaft which extends parallel to the input and output shafts.

4. A two speed transmission system as claimed in claim 3, wherein gears of the input shaft and output shaft for transmitting drive to and from the lay shaft are located between the friction clutches and an output end of the output shaft.

5. A two speed transmission system as claimed in claim 1 wherein a one-way clutch means is incorporated in the first gear train such that the first gear train is able to overrun when the second gear train is transmitting drive.

6. A two speed transmission system as claimed in claim 1, wherein the gear trains are selected to provide a higher gearing of the lay shaft when the second clutch means is engaged.

7. A two speed transmission system as claimed in claim 1, wherein the gear trains are selected to provide a lower gearing of the lay shaft when the second clutch means is engaged.

8. A two speed transmission system as claimed in any one of the preceding claims further including a control system for controlling the first and second clutches.

9. A two speed transmission system as claimed in claim 8 further including sensors for supplying information to the control system, the sensors including one or more of clutch pressure sensors, sensors measuring the speed of the input shaft and output shaft respectively and sensors providing information relating to the position of gears in the gear trains.

10. A two speed transmission system as claimed in claim 8 further including one or more control valves and electro-hydraulic solenoids to provide controlled clutch slip for docking and other functions where very low speeds of the order of a few knots may be desired.

11. A watercraft incorporating a two speed transmission system as claimed in claim 1, wherein the transmission is incorporated as part of a stern drive unit.

* * * * *